US00RE50523E

(19) United States
(12) Reissued Patent
Froehlich et al.

(10) Patent Number: US RE50,523 E
(45) Date of Reissued Patent: Aug. 5, 2025

(54) RADIO ACCESS NETWORK SERVICE MEDIATED ENHANCED SESSION RECORDS FOR ARTIFICIAL INTELLIGENCE OR MACHINE LEARNING

(71) Applicant: NetScout Systems, Inc., Westford, MA (US)

(72) Inventors: Robert William Froehlich, McKinney, TX (US); Wing F. Lo, Plano, TX (US)

(73) Assignee: NetScout Systems, Inc., Westford, MA (US)

(21) Appl. No.: 17/939,829

(22) Filed: Sep. 7, 2022

Related U.S. Patent Documents

Reissue of:
(64) Patent No.: 11,265,786
Issued: Mar. 1, 2022
Appl. No.: 17/003,417
Filed: Aug. 26, 2020

U.S. Applications:
(60) Provisional application No. 62/972,966, filed on Feb. 11, 2020.

(51) Int. Cl.
*H04W 4/00* (2018.01)
*H04W 24/08* (2009.01)
(Continued)

(52) U.S. Cl.
CPC ..... *H04W 76/27* (2018.02); *H04W 24/08* (2013.01); *H04W 76/15* (2018.02); *H04W 88/06* (2013.01); *H04W 24/04* (2013.01)

(58) Field of Classification Search
CPC ..... H04W 24/08; H04W 76/27
See application file for complete search history.

(56) References Cited

U.S. PATENT DOCUMENTS 8,582,454 B2 * 11/2013 Singhal ..... H04L 41/069 709/224
8,995,255 B2 * 3/2015 Chou ..... H04W 76/15 370/229

(Continued)

FOREIGN PATENT DOCUMENTS

EP 1780944 A1 * 5/2007 ..... H04L 41/06

OTHER PUBLICATIONS

Gacanin, H. and M. Wagner "Artificial Intelligence Paradigm for Customer Experience Management in Next-Generation Networks: Challenges and Perspectives", IEEE Network, vol. 33, Issue 2 Mar./Apr. 2019, pp. i88-i94. (Year: 2019).*

*Primary Examiner* — Luke S Wassum
(74) *Attorney, Agent, or Firm* — Foley & Lardner LLP

(57) ABSTRACT

A computer-implemented method of monitoring a radio access network (RAN) is provided. The method includes receiving access stratum data that is a function of cell trace records (CTRs) associated with wireless communication transported to or from one or more cells of the RAN, wherein the CTRs are obtained at a granularity sufficient to detect one or more events, the events defining a segment or occurring during a segment, wherein a segment is defined by the beginning, end, or any handovers of a call included in the wireless communication. The method further includes detecting in the access stratum data one or more state transitions as indicated by the events and outputting an enhanced session record (ESR) including information processed from the access stratum data associated with the respective one or more detected state transitions.

21 Claims, 9 Drawing Sheets

(51) Int. Cl.

| | |
|---|---|
| ***H04W 36/00*** | (2009.01) |
| ***H04W 36/14*** | (2009.01) |
| ***H04W 76/15*** | (2018.01) |
| ***H04W 76/27*** | (2018.01) |
| ***H04W 88/06*** | (2009.01) |
| *H04W 24/04* | (2009.01) |

(56) References Cited

U.S. PATENT DOCUMENTS

| | | | | |
|---|---|---|---|---|
| 10,177,964 | B2 * | 1/2019 | Kollipara | H04L 41/5064 |
| 10,721,707 | B2 * | 7/2020 | Jain | H04W 16/18 |
| 10,733,167 | B2 * | 8/2020 | Pope | H04L 43/028 |
| 10,966,108 | B2 * | 3/2021 | Froehlich | G06N 3/042 |
| 11,265,786 | B2 * | 3/2022 | Froehlich | H04W 24/08 |
| 2017/0118796 | A1 * | 4/2017 | Arunachalam | H04W 24/08 |
| 2020/0022006 | A1 * | 1/2020 | Froehlich | H04W 24/08 |
| 2020/0092776 | A1 * | 3/2020 | Edge | H04W 4/029 |
| 2021/0092793 | A1 * | 3/2021 | Centonza | H04W 64/00 |
| 2021/0241090 | A1 * | 8/2021 | Chen | H04W 24/02 |
| 2021/0250831 | A1 * | 8/2021 | Froehlich | H04W 36/14 |

* cited by examiner

A

| Event Id | Event | Event Time Stamp | Latitude | Longitude | Current State |
|---|---|---|---|---|---|
| 1 | RRC Setup | 13:11:23.000 | 33.028082 | -96.708407 | RRC Idle |
| 2 | eRAB Setup attempt | 13:11:23.040 | | | RRC Connected |
| 3 | Measurement Report | 13:11:23.080 | 33.02820611 | -96.70835324 | RRC Connected |
| 4 | Add Secondary Carrier | 13:11:23.120 | | | RRC Connected |
| 5 | eRAB Setup attempt | 13:11:26.200 | | | RRC Connected |
| 6 | Measurement Report | 13:11:33.400 | 33.04421682 | -96.70141872 | RRC Connected |
| 7 | Release Secondary Carrier | 13:11:34.520 | | | RRC Connected |
| 8 | UE Report | 13:11:34.600 | 33.04452711 | 96.70128433 | RRC Connected |
| 9 | UP Info Start Gap | 13:11:38:440 | | | |
| 10 | Measurement Report | 13:11:39.120 | 33.05309097 | -96.69757517 | RRC Connected |

A

Fig. 3A

A B

| Next State | Event Parameter list | Aggregated Carrier count | Dual Connectivity count | eRAB Count |
|---|---|---|---|---|
| RRC Connected | List of attribute value pairs for event 1 | 0 | 0 | 0 |
| RRC Connected | List of attribute value pairs for event 2 | 0 | 0 | 0 |
| RRC Connected | List of attribute value pairs for event 3 | 0 | 0 | 2 |
| RRC Connected | List of attribute value pairs for event 4 | 0 | 0 | 2 |
| RRC Connected | List of attribute value pairs for event 5 | 1 | 0 | 2 |
| RRC Connected | List of attribute value pairs for event 6 | 1 | 0 | 3 |
| RRC Connected | List of attribute value pairs for event 7 | 1 | 0 | 3 |
| RRC Connected | List of attribute value pairs for event 8 | 0 | 0 | 3 |
| | List of attribute value pairs for event 9 | | | |
| RRC Connected | List of attribute value pairs for event 10 | 0 | 0 | 3 |

A B

Fig. 3B

B

| Serving PCell | Comments |
|---|---|
| 17235745 | Start of RRC |
| 17235745 | Setup two default EPS bearer one to IMS and one to Internet. |
| 17235745 | Measurement Report from UE contains DL signals from serving cell and nearby cells |
| 17235745 | Add Secondary Cell in Carrier Aggregation |
| 17235745 | Add dedicated EPS bearer to support new VoLTE call. |
| 17235745 | Measurement Report from UE contains DL signals from serving cell and nearby cells |
| 17235745 | Release Secondary Cell (Carrier) |
| 17235745 | UE report from Secondary carrier being released. |
| | User Plane Information start of user plane traffic gap |
| 17235745 | Measurement Report from UE contains DL signals from serving cell and nearby cells |

B

Fig. 3C

RADIO ACCESS NETWORK SERVICE MEDIATED ENHANCED SESSION RECORDS FOR ARTIFICIAL INTELLIGENCE OR MACHINE LEARNING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS REFERENCE] *CROSS-REFERENCE* TO RELATED *PATENT* APPLICATIONS

*This application is a reissue of U.S. Pat. No. 11,265,786 B2, issued on Mar. 1, 2022, which claims priority to U.S. application Ser. No. 17/003,417, filed on Aug. 26, 2020, which patent and application are incorporated herein by reference in their entirety.* This application *also* claims priority to U.S. Patent Application Ser. No. 62/972,966, filed Feb. 11, 2020, which is incorporated herein by reference in its entirety.

FIELD OF THE DISCLOSURE

The present technology relates to communication network monitoring and, more particularly, methods and systems to radio access network (RAN) service mediated enhanced session records for artificial intelligence or machine learning automation.

BACKGROUND

Monitoring and analysis of data to and from a Radio Access Network (RAN) or group of RANs has been increasing in complexity with the advent of 5G, densification, and higher demands of functionality.

A RAN or group of RANs can be monitored based on input data. Examples of input data include output from performance managers that measure performance; cell trace record (CTR) data that includes raw signaling of radio resource control (RRC) procedures, and location at the end of a call. CTRs can include requests, responses, cause codes, measurement reports (MRs), and performance information (such as user plane uplink/downlink throughput). MRs can include, for example, reference signal received power (RSRP), reference signal received quality (RSRQ), signal-to-interference-plus-noise ratio (SINR), and timing advance (TA). CTRs include raw RAN signaling sent by network infrastructure cell sites (eNB for Long-Term Evolution (LTE) and gNB for 5G).

In an RRC flow there is typically an RRC start, an RRC end that involves RRC reconfiguration, and possibly one or more RRC handovers that also involve RRC reconfiguration. A single RAN data record, which is a mediated high-level summary of a RAN signaling procedure that includes only selected, valuable information, can be sent in association with each start, handover, and end RRC. For example, the RAN data record includes start/end times; summarized radio frequency (RF) parameters (e.g., Reference Signal Received Power (RSRP), Reference Signal Received Quality (RSRQ)); cell ID, which identifies a cell; geolocation of last RRC (in other words, provided at end only); and quality of service (QoS) Class Identifier (QCI). RAN data records can be provided in a CSV file, with each row dedicated to one RRC event. The CSV file can also provide summarized end of call information.

A monitor device can provide certain correlation (such as correlation of an RRC flow to an international mobile subscriber identity (IMSI)), track events marking the RRC start, end and handovers related to a call (e.g., by a state machine), and filter salient information from an MR. However, the output from such monitoring can be very extensive, such as in the form of LTE Layer 3 (L3, the RRC layer) messages that are session records having all of the CTR signaling, or very limited, such as in the form of location session records (LSRs).

Raw trace-port feed of CTRs from an eNB include tens to hundreds of messages for each call (referred to as an RRC Connection in 3GPP standards terminology), depending on the duration of the call. The volume of data for all the L3 messages of a single call when exported in XML can often reach ten Megabytes or more. The raw trace-port data feed format contains all the L3 events and messages, which includes all events for the user equipment (UE) that are currently served by the eNB.

Before an artificial intelligence (AI) or machine learning (ML) system can use the raw trace-port feed data from the eNBs, substantial processing power is needed to decode, correlate, and enrich the data to a level that is suitable for ML consumption. For example, the messages would need to be sorted per UE, decoded, and sequenced to track the state of a call. The collection of events would also need to be restructured into per call data records. Accordingly, hefty analysis of this data is needed for troubleshooting, which is not appropriate for ongoing monitoring and in real time.

On the other hand, an LSR provides a concise, one row description for each call segment. A call segment is the part of a call served by one cell between call beginning, handovers, and call ends. For example, a call with one handover consists of two segments. An LSR typically consists of over a hundred attributes. A call without handover will be summarized into a single record. A call with n handovers will be summarized into n+1 records.

The size of a typical LSR for an LTE call is less than a kilobyte. LSRs are used by carrier big data lakes to a) create RAN KPIs and b) provide intelligence for basic machine learning, such as for analysis of abnormal causes to find probable root cause. However, the highly condensed LSR data often have too much useful data abstracted away for practical ML purposes.

While the LSR data provides good information for quality of experience (QoE) issues, such as retainability (handovers and drops), current analysis tools and data records do not provide information to assess quality of user plane (UP) experience. UP experience can be affected, for example, by throughput, UP disruptions (e.g., call gaps), and causes for excessive layer 4-8 requests for retransmissions over the RAN.

A call gap is a loss of audio or video (OSI layer 8) caused by the RAN. Core network control and user plane signaling may seem to be working normally, but, the mobile user experiences loss of audio or video. When this issue is analyzed with conventional RAN tools (e.g., counters and RAN data records), the intra call RF quality of service (QOS) is not available, rendering it impossible for a troubleshooter to determine a root cause of the particular call gap. This is also true for acute call gap analysis, wherein an acute call gap occurs when many subscribers within a cell or group of cells are affected.

For the purposes of monitoring UP experience, the L3 messages are cumbersome and consume many resources, whereas the data provided by the LSR lacks information indicative of UP experience.

Conventional methods and systems for collecting RAN data have generally been considered satisfactory for their intended purpose. However, there is still a need in the art for, there is still a need for scalable collection of RAN data that is suitable for monitoring and analysis of UP experience.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to monitor a radio access network (RAN). The method includes receiving access stratum data that is a function of cell trace records (CTRs) associated with wireless communication transported to or from one or more cells of the RAN. The CTRs are obtained at a granularity sufficient to detect one or more events. The events include one or more events that define a segment and one or more events that occur during a segment, wherein a segment is defined by the beginning, end, or any handovers of a call included in the wireless communication. The method further includes detecting in the access stratum data one or more state transitions as indicated by the events and outputting an enhanced session record (ESR) including information processed from the access stratum data associated with the respective one or more detected state transitions.

In one or more embodiments, the access stratum data can include geolocation data and the method can further include correlating a geolocation from the access stratum data to the respective state transitions. In addition, the ESR can further include the geolocation data correlated to the one or more detected state transitions.

In one or more embodiments, the ESR can include data from at least two of: control or user plane messages between a user equipment of one or more user equipment and any of the base stations of the cells of the RAN, wherein each of the one or more user equipment is using the RAN for communication with another of the one or more user equipment; control messages between any of the base stations and one or more core components of an evolved packet core station of a data packet communication network; communication between any two of the base stations; control messages between a user equipment and the one or more core components; identification information identifying one or more of the user equipment; and identification information identifying one or more subscribers using the one or more user equipment.

In one or more embodiments, the access stratum data can include information about radio frequency conditions internal to a cell of the one or more cells and associated with the one or more detected state transition, wherein detecting in the access stratum data the one or more state transitions further can include detecting information about the radio frequency conditions internal to the cell correlated to the one or more detected state transitions, and wherein the ESR can further include the information about the radio frequency conditions internal to the cell correlated to the one or more detected state transitions.

In one or more embodiments, the access stratum data includes high level user plane data including bandwidth and throughput user plane conditions from the CTRs and indicators of identification of the one or more cells, and the method can further include detecting the user plane data about the bandwidth and throughput user plane conditions over time, internal to an identified cell of the one or more cells and correlated to the one or more detected state transitions, and wherein the ESR can further include the detected user plane data about the bandwidth and throughput user plane conditions over time, internal to an identified cell of the one or more cells and correlated to the one or more detected state transitions.

In one or more embodiments, the one or more detected state transitions can include at least one of: receipt of measurement reports received from the user equipment, and the enhanced ESR further includes selected information from the received measurement reports; receipt of signaling information on the addition of one or more secondary carriers between the user equipment and one or more secondary cells, and the ESR further includes selected information related to the added one or more secondary carriers; and receipt of signaling information on the release of one or more secondary carriers between the user equipment and one or more secondary cells, and the ESR further includes selected information related to the released one or more secondary carriers.

In one or more embodiments, the method can further include receiving non-access stratum (NAS user plane (UP) data derived from NAS UP signaling from a core component of a data packet communication network, wherein the NAS UP data correlates to the wireless communication and correlating the NAS UP data and the AS data. The ESR can further include results of the correlation between the NAS UP data and the AS data.

In one or more embodiments, the NAS UP data can include quality of service information and correlating the NAS UP data and the AS data can include correlating the quality of service information to the AS data and the one or more detected state transitions.

In one or more embodiments, the method can include generating a visual display of the correlations between the NAS UP data and the AS data.

In one or more embodiments, the method can further include receiving subscriber correlation data that correlates a non-international mobile subscriber identity (IMSI) subscriber temporary ID included in the ESR to an IMSI and correlating the non-IMSI subscriber temporary ID to its IMSI. The ESR can further include representation of the correlation of the non-IMSI subscriber temporary ID to its IMSI.

In one or more embodiments, the method can further include inputting results of the correlation to a machine-learning algorithm.

In accordance with another aspect, a computer-implemented method of monitoring a RAN is provided. The method includes receiving access stratum data that is a function of CTRs associated with wireless communication transported to or from one or more cells of the RAN. The access stratum data identifies user equipment and associated timestamps with radio resource control (RRC) events represented in the access stratum data. The method further includes receiving NAS UP data derived from NAS user plane signaling from a core component of a data packet communication network in association with the wireless communication, wherein the NAS UP data includes timestamps and identification of user equipment. The method further includes correlating, using the timestamps and identification of end user devices, the NAS UP data and the AS data. An enhanced session record (ESR) is output that includes results of the correlation between the NAS UP data and the AS data.

In one or more embodiments, the access stratum data can include geolocation data. Correlating the NAS UP data and the AS data can include correlating geolocation data from the access stratum data to the NAS UP data.

In one or more embodiments, the access stratum data can include information about radio frequency conditions internal to a cell of the one or more cells. Correlating the NAS UP data and the AS data can include correlating the radio frequency conditions from the access stratum data to the NAS UP data.

In one or more embodiments, the access stratum data includes high-level user plane data including bandwidth and throughput user plane conditions from the CTRs and indicators of identification of the one or more cells. Correlating the NAS UP data and the AS data can include correlating the bandwidth and throughput user plane conditions over time for an identified cell to the NAS UP data.

In one or more embodiments, the NAS UP data can include quality of service information and correlating the NAS UP data and the AS data includes correlating the quality of service information to the AS data.

In one or more embodiments, the method further include inputting results of the correlation information to a machine learning algorithm.

In accordance with a further aspect, a communication network monitoring system for monitoring a RAN is provided. The communication network monitoring system includes a memory configured to store instructions and a processor in communication with the memory, wherein the processor, upon execution of the instructions, is caused to receive access stratum data that is a function of CTRs associated with wireless communication transported to or from one or more cells of the RAN. The CTRs are obtained at a granularity sufficient to detect one or more events. The events include one or more events that define a segment and one or more events that occur during a segment, wherein a segment is defined by the beginning, end, or any handovers of a call included in the wireless communication. The processor, upon execution of the instructions, is further caused to detect in the access stratum data one or more state transitions as indicated by the events and output an ESR, the ESR including information processed from the access stratum data associated with the respective one or more detected state transitions.

In one or more embodiments, the processor, upon execution of the instructions, can be further caused to receive NAS UP data derived from NAS UP signaling from a core component of a data packet communication network, wherein the NAS UP data correlates to the wireless communication. The processor, upon execution of the instructions, can be further caused to correlate the NAS UP data and the AS data. The ESR can include results of the correlation between the NAS UP data and the AS data.

In accordance with a further aspect, a communication network monitoring system for monitoring a RAN is provided. The communication network monitoring system includes a memory configured to store instructions and a processor in communication with the memory, wherein the processor, upon execution of the instructions, is caused to receive access stratum data that is a function of CTRs associated with wireless communication transported to or from one or more cells of the RAN. The access stratum data identifies user equipment and associated timestamps with RRC events represented in the access stratum data. The processor, upon execution of the instructions, is further caused to receive NAS UP data derived from NAS user plane signaling from a core component of a data packet communication network in association with the wireless communication. The NAS UP data includes timestamps and identification of user equipment. The processor, upon execution of the instructions, is further caused to correlate, using the timestamps and identification of end user devices, the NAS UP data and the AS data, and output an ESR includes processed results of the correlation between the NAS UP data and the AS data.

In one or more embodiments, the NAS UP data can include quality of service information and correlating the NAS UP data and the AS data includes correlating the quality of service information to the AS data.

In accordance with still another aspect, a non-transitory computer readable storage medium and one or more computer programs embedded therein is disclosed. The computer programs include instructions, which when executed by a computer system, cause the computer system to perform the disclosed method.

BRIEF DESCRIPTION OF THE DRAWINGS

The accompanying appendices and/or drawings illustrate various non-limiting, example, inventive aspects in accordance with the present disclosure:

FIGS. 3A-3C illustrate an event history table storing data about events and state transition, in accordance with an illustrative embodiment of the present disclosure;

DETAILED DESCRIPTION OF CERTAIN EMBODIMENTS

Figure 1:
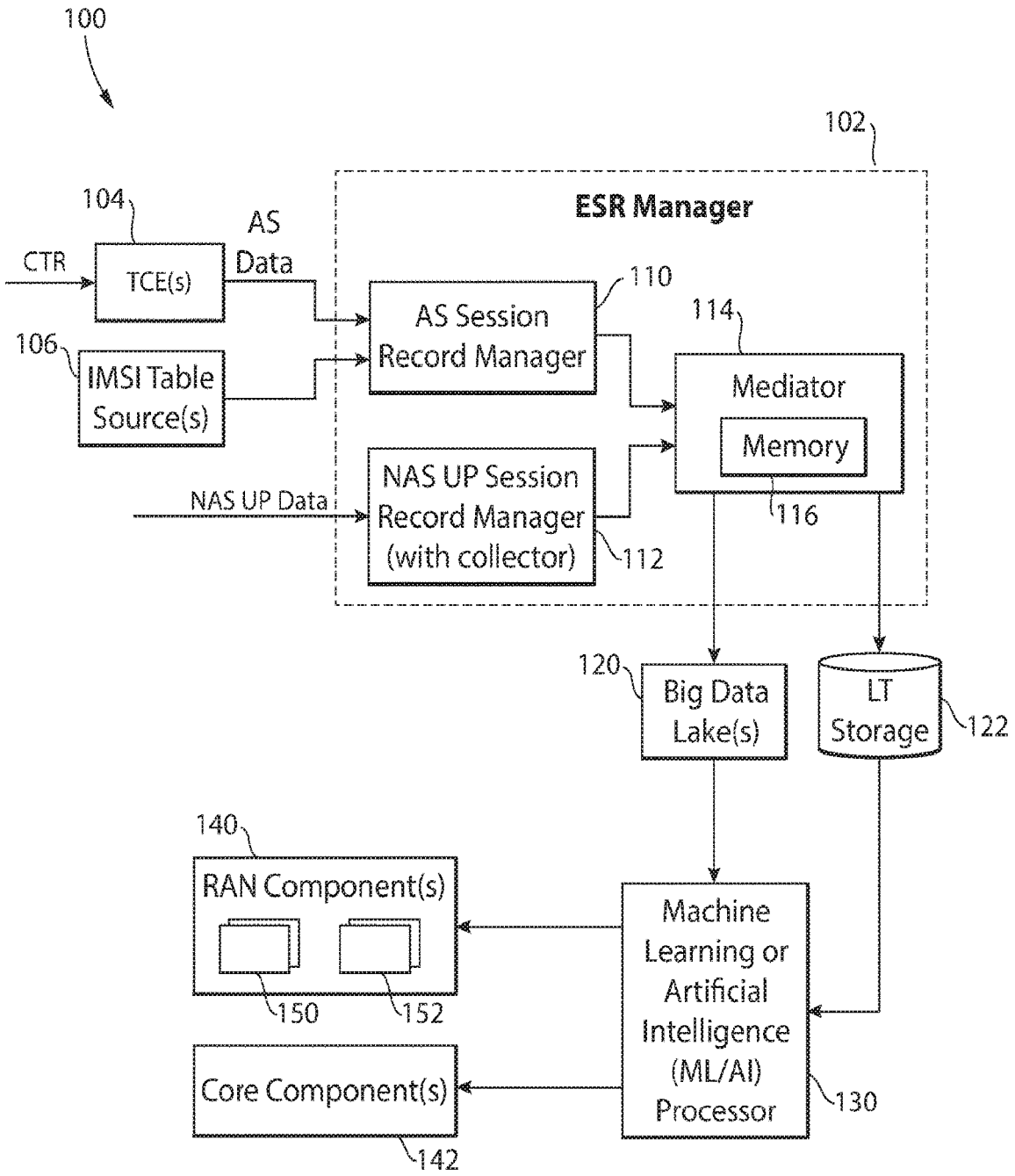
FIG. 1 illustrates a block diagram of an example communication network system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a communication network monitoring system in accordance with the disclosure is shown in FIG. 1 and is designated generally by reference character 100. Other embodiments of the communication network monitoring system 100 in accordance with the disclosure, or aspects thereof, are provided in FIGS. 2-6, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, communication network monitoring system 100 includes an enhanced session record (ESR) manager 102. ESR manager 102 includes an access stratum (AS) session record manager 110, a non-AS (NAS user plane (UP) session record manager 112, and a mediator 114. AS session record manager 110 receives AS data from a trace collection entity (TCE) 104 and further receives an international mobile subscriber identity (IMSI) table source 106. The AS data includes high-level radio bearer level user plane data that includes indications of radio conditions, such as bandwidth and throughput. High level radio bearer level user plane data refers to the first two layers of the Open Systems Interconnection (OSI) model, the first layer being the physical layer (PHY) and the second layer being the data link layer for physical addressing, e.g., medium access control (MAC) and logical link control (LLC). NAS, UP session record manager 112 receives NAS UP data and shares information with AS session record manager 110. Mediator 114 correlates information received from the AS session record manager 110 and NAS UP session record manager 112 and outputs ESRs that include results of the correlation to big data lakes 120 and long term (LT) storage 122.

The communication network is described for illustration purposes as a long-term evolution (LTE) network, however the communication network monitoring system 100 can monitor communication networks that operate with different architectures and protocols, such as 3G or 5G communication networks.

When receiving the AS data from a radio access network (RAN), AS session record manager 110 detects state transitions, including mid-segment-state transitions that occurred during a segment. State transitions are triggered by radio resource control (RRC) events (also referred to as events) detected in the call trace records (CTRs) intercepted by the TCEs 104. The events can define a segment or occur during a segment. A segment is defined by the beginning, end, or any handovers of a call. One skilled in the art will understand that the NAS UP session record manager 110 that manages core network signaling does not have exposure to the RAN or state transitions associated with the AS data. However, mediator 114 operates on results of analysis of state transitions detected in the AS data by AS session record manager 110 as well as results of analysis of the NAS UP data by the NAS UP session record manager 112, providing the ability to make correlations between results of both of these analyses.

One skilled in the art will understand that NAS data can include NAS UP and NAS control plane data. The mediator 114 operates on results of analysis of the NAS UP data by the NAS UP session record manager 112 for the purposes of correlation with radio conditions and/or the AS data. In response to notification by the AS session record manager 110 that a state transition (including mid-segment state transitions) was detected, the mediator 114 selects and/or processes the AS and NAS UP data. Each mid-segment state transition correlates to one or more detected events that occurred during a segment. The processing of the AS and NAS UP data can include correlating non-IMSI subscriber temporary IDs with IMSIs using an IMSI table provided by one or more of the IMSI table sources 106, correlating geolocation data to mid-segment state transitions, and/or correlating identification of cells of the RAN to mid-segment state transitions. Furthermore, the mediator 114 selects and/or processes the AS and NAS UP data as a function of the states involved in the state transition. The mediator 114 outputs ESRs that include the selected and/or processed AS data, such as to big data lakes 120 and/or for long-term storage 122.

Unlike Layer 3 (L3) messages and Location Session Records (LSRs), the ESRs include enriched information and are suitable for ingestion by applications for machine learning and/or artificial intelligence. L3 messages and LSRs have had limited use for different reasons. L3 messages include a large amount of data that burdens resources, much of which is not needed for the ESR manager's purposes. LSRs are limited to a small amount of high-level information and lack information about events that occurred during a segment. On the other hand, ESRs do provide information about events that occurred during individual segments, including events that correlate to mid-segment state transitions. The ESRs provide a service level view that can be output to big data lakes 120, e.g., for direct input to an artificial intelligence system that uses machine learning. The ESRs provide valuable information including, at least, a) a correlation between call procedures (e.g., referred to as RRC connection in 3GPP standards terminology) indicated by the CTRs provided by the CTEs and UP NAS (e.g., S1-U) procedures b) correlation of the call procedures to a subscriber IMSI or International Mobile Equipment Identity (IMEI) or handset, c) available information naturally sorted by service type. (which can be used, as disclosed herein, to identify how the RAN provides various radio bearer to requested UP services as needed), d) a concise, set of relevant RF session parameters, including information associated with mid-session state transitions (as by measurement reports (MR) and state transitions shown in state diagram 200 of FIG. 2), and e) geolocation of events that occurred during the one or more segments.

Since the information provides insight to mid-session state transitions, the ESRs output by the ESR manager can be useful for analysis of mid-session conditions that are associated with acute and systemic issues, such as call gaps. Furthermore, since the information is associated with state transitions, the information is limited to important events associated with the state transitions. Relative to L3 messages, this eliminates much data that would be irrelevant. The ESRs are useful for manual or automatic artificial intelligence or machine learning tools (AI/ML) tools for providing insights, for example about a particular cell, surrounding cells, a RAN group within a service provider group. Insights gained can be used to fix issues and provide improved service that improves user quality of experience.

TCEs 104 are intercept devices (e.g., taps or probes) that are configured to intercept CTRs output by a RAN at intervals that are short enough to correlate with intra-segment events. The CTRs are files from eNBs or gNB for 5G of the RAN that include traced information associated with each call handled by the eNB. The respective TCEs 104 can be configured to collect CTRs, decode CTRs, and/or filter the CTRs for outputting AS data that is tailored to be pertinent for the AS Session record manager 110.

The TCEs 104 intercept CTRs at a granular level sufficient for detecting one or more events, including the events that occur during a segment as well as events that define a segment.

In one or more embodiments, the CTEs 104 are embodied as nGenius™ Probes, nGenius InfiniStream™, or any InfiniStream Next generation probe, collectively referred to as ISNG™ probes available from NetScout Systems™, Inc. of Westford, Mass.

The NAS and UP data includes UP flow records provided by a UP link, such as a link for S1-U, which can be obtained by taps or probes on the S1-U link. An example of UP flow records determined by correlating user plane and control plane packets is described in U.S. patent application Ser. No. 12/756,638 entitled "Real-Time Adaptive Processing of Network Data Packets for Analysis" and filed on Apr. 8, 2010, now U.S. Pat. No. 8,582,454, the entire contents of which are incorporated by reference. The UP data provides Layer 3 to 4 that is correlated to the AS RAN signaling (provided by cell trace).

The ESR manager 102 includes one or more processing devices configured to receive AS data from the TCE(s) 104, the IMSI table source(s) 106 and NAS UP data and output ESRs, such as to big data lakes 120 and/or long-term storage 122. ESR manager 102 and TCEs 104 may each include a special purpose computing device or a software component (not limited to a single process) dedicated to its corresponding functions related to managing AS session records, collecting and managing NAS UP session records, mediating ESRs, and outputting the ESRs. The components of ESR manager 102, namely AS session record manager 110, NAS UP session record manager 112, and mediator 114 can be implemented using one or more respective processing devices and/or can share hardware or software components.

AS session record manager 110 is configured to receive AS data from TCEs 104 (wherein the AS data processed from the CTRs intercepted by the TCEs 104), detect events in the AS data, including intra-segment event, and create state machines for states that correspond to the detected events. The AS data includes a dialogue between user equipment and the radio network. The state machines can be created and dynamically updated on the fly while AS session record manager 110 is operating, such as by analyzing the RRC and X2 signaling for "request" and corresponding "accept/complete" messages or timeout conditions, assuming that the corresponding "accept/complete" message was lost. The state machines are stored in AS session record manager 110 in a data store associated with each of the AS session record manager 110 and NAS UP session record manager 112, together with raw NAS and AS packets.

The state machines include state machines created for intra-segment states that correspond to the intra-segment events). AS session record manager 110 is further configured to aggregate information from the received AS data, count performance measures indicated by the AS data, determine geolocation information related to the states, including at least one intra-segment state. AS session record manager 110 is further configured to receive IMSI tables from IMSI table sources 106. AS session record manager 110 can correlate the AS data with information from the IMSI table sources 106 to provide IMSI enrichment. AS session record manager 110 is configured to provide a high level RAN session dataset to mediator 114.

NAS UP session record manager 112 receives and/or collects NAS UP data. The NAS UP data includes a dialogue between the user equipment and core network nodes. The NAS UP can be collected by the NAS UP session record manager 112 from a S1-U or other UP link from the core network nodes. The NAS UP session record manager 112 is configured to prepare UP flow records, such as by applying intelligent analysis of packet and flow data. NAS UP session record manager 112 extracts data related to quality of service (QoS), including providing IMSI and/or IMEI data (e.g., IMSI and/or IMEI tables) to AS session record manager 110 for correlation with the AS data.

Mediator 114 receives and correlates the data output by the AS session record manager 110 and the NAS UP session record manager 112 and provides ESRs that are a function of this correlation. The ESRs can be output in different formats, such as to big data lakes 120 or to long-term storage 122. For example, when output to big data lakes 120, the ESRs can be formatted in a language that can be used to transfer data from one computer to another or from one program to another on the same computer, such as JavaScript Object Notation (JSON) or the like.

Figure 1A:
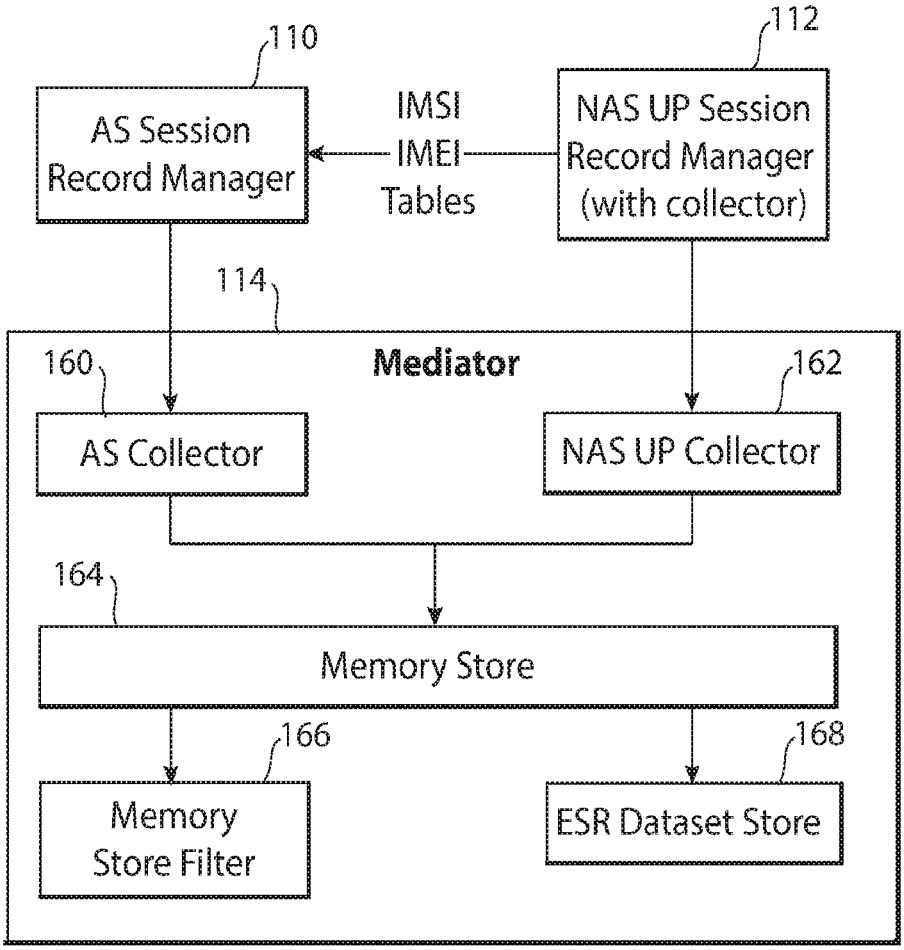
FIG. 1A illustrates a data flow diagram of an example method of processing data by a mediator of the communication network system shown in FIG. 1.

With reference to FIG. 1A, a data flow diagram is shown that illustrates an example method of processing data by mediator 114. Mediator 114 includes AS collector 160, NAS UP collector 162, memory store 164, memory store filter 166, and ESR dataset store. AS collector 160 collects output from AS session record manager 110 and NAS UP collector 162 collects output from NAS UP session record manager 112. AS collector 160 and NAS UP collector 162 store the data that was collected in memory store 164 with the collected data indexed by IMSI or IMEI. The data in memory store 164 can further be indexed by timestamp in order to accommodate late data arrival.

Memory store filter 166 stores selectable salient information that is selected from memory store 164. The selection of salient information to be stored in memory store filter 166 can be configured per user.

ESR dataset store 168 stores ESRs that are mediated by mediator 114 and output, such as to big data lakes 120 and/or long-term storage 122. The ESRs output by mediator 114 can include, for example and without limitation, one or more of the following data in association with inter-segment and intra-segment events, after performing processing and selecting, including correlating selected data:

- RAN session start correlated to IMSI
- IMSI of subscriber
- Service type (e.g., QoS Class Identifier (QCI), etc.)
- E-UTRAN Radio Access Bearer (ERAB) activity (setup and removal)
- Frequency used
- Beamforming attributes
- Handover(s) including global cell identities
- Add or remove of secondary cell carriers in carrier aggregation
- Setup secondary cell in dual connectivity
- RRC connection re-establishment
- Received measurement report details
- Transmission time interval (TTI) bundling
- RAN session end In one or more embodiments, communication network monitoring system 100 can further include a machine learning and/or artificial intelligence (ML/AI) processor 130 and/or one or more radio area network (RAN) components 140 (e.g., one or more cells 150 and/or one or more base stations 152) or one or more core components 142 of a communication network being monitored. The ML/AI processor 130 can process the ESRs, for example to determine information and/or patterns associated with particular cells, particular geographic areas, and/or subscribers, including radio parameters such as uplink and down link signal power and signal to noise ratios. Once patterns are determined, causes of problems and/or trends can be identified. Functionality of different cells or geographic areas can be compared. Parameters used by one or more RAN components 140 (e.g., an eNB of a cell 150 or a base station 152), and/or one or more core components 142 (e.g., an MME, S-GW, P-GW, and/or HSS) can be adjusted and evaluated using machine learning.

Figure 2:
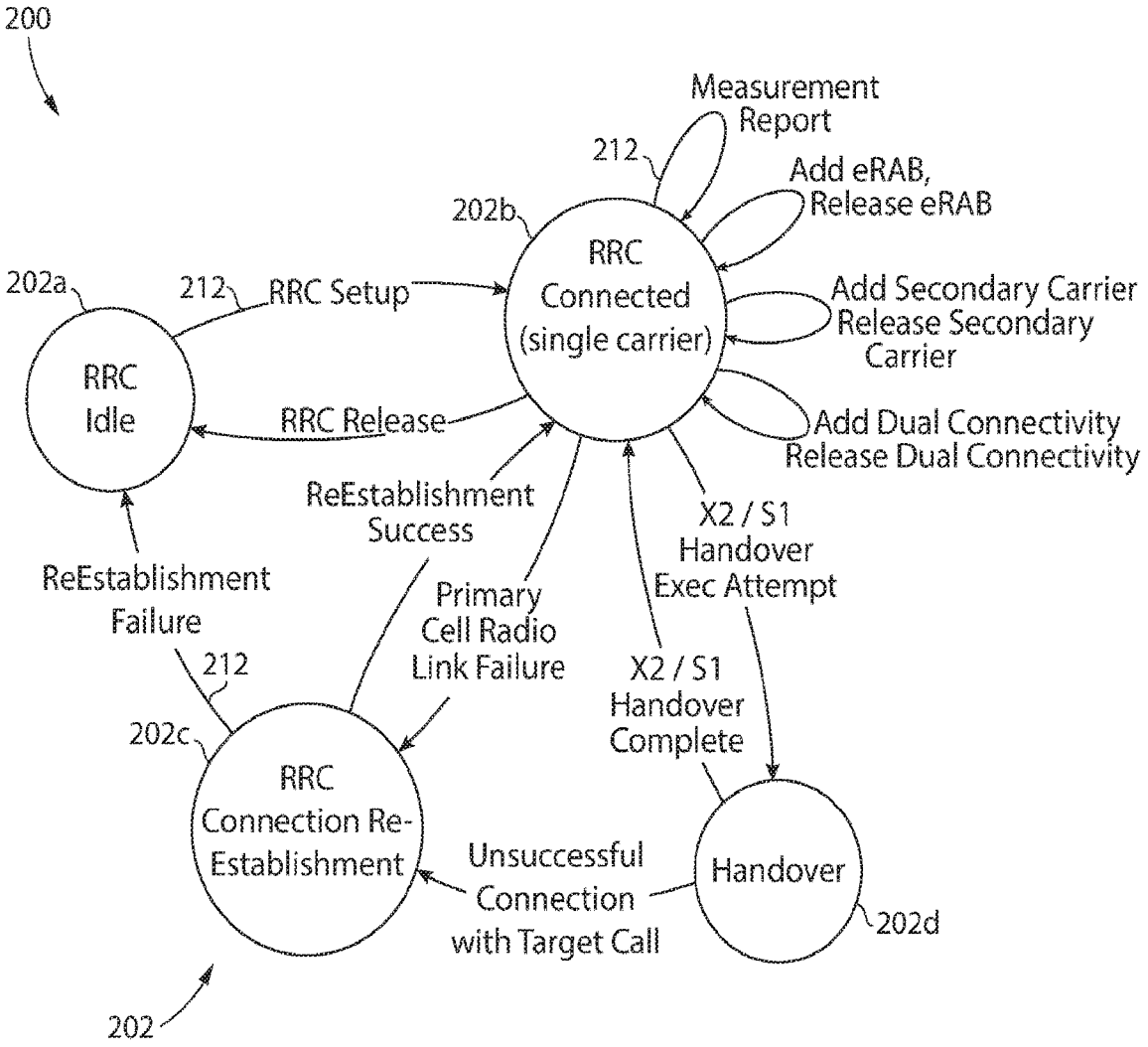
FIG. 2 illustrates a state diagram of state transition of a call handled by a radio access network (RAN) of a communication network being monitored, in accordance with an illustrative embodiment of the present disclosure.

FIG. 2 shows a state diagram 200 of example states RRC idle state 202a, RRC connected state 202b, RRC connection re-establishment state 202c, and handover state 202d, referred to collectively as states 202. AS session record manager 110 analyzes the AS data and recognizes states 201 and example major events represented by arrows 212 that trigger a transition between states 201 or result in a decision to continue in the same state 201. An RRC setup event causes a transition from RRC idle state 202 to RRC connected state 202b, which is initially uses a single carrier.

Once in RRC connected state 202b, the following events are included in the event history without changing states: receipt of a measurement report, addition of an ERAB or release of an ERAB, addition of a secondary carrier or release of a secondary carrier, and addition of dual connectivity or release of dual connectivity. ERAB transition from the RRC connected state 202b to the RRC connection reestablishment state 202c occurs upon the event of a primary cell radio link failure event. A transition from the RRC connected state 202b to the handover state 202d occurs upon the event of an X2/S1 handover Exec attempt. A transition from the RRC connected state 202b back to the RRC idle state 202a occurs upon the event of an RRC release.

Once in RRC connection reestablishment state 202c, a transition from the RRC connection reestablishment state 202c back to the RRC connected state 202b occurs upon a reestablishment success event. A transition from the RRC connection reestablishment state 202c to the RRC idle state 202a occurs upon a reestablishment failure event.

Once in a handover state 202d, a transition from the handover state 202d back to the RRC connected state 202b occurs upon an X2/S1 handover complete event. A transition from the handover state 202d to the RRC connection reestablishment state 202c occurs upon an unsuccessful connection with target cell event.

Mediator 114 records the events and state transitions in an event history table. An example event history table 300 is shown in FIGS. 3A-3C as Table 300. Table 300 can be stored in memory 116 that is included in or accessible by mediator 114. Mediator 114 enriches information in the event history table, such as by geolocation enrichment, in which geolocation is correlated to the individual events; cell ID enrichment, in which radio level identities, such as physical cell ID or Peripheral Component Interconnect (PCI) to cell ID is correlated to the individual events; and user identity enrichment, in which IMSIs are correlated to the individual events. The correlations used to enrich the data in the event history table are performed by the AS session record manager 110 by correlating AS data to IMSI data in IMSI tables obtained from IMSI table sources 106, and NAS UP session record manager 112.

In the events history table shown in Table 300, column A provides a number assigned to each event. Column B provides a descriptive label for the event. Column C provides a time stamp for the time at which the event was detected. Columns D and E provide geolocation information for the event when the event was detected (here shown as latitude and longitude), provided by geolocation enrichment. Column F identifies the current state at the time the event was detected, and column G identifies the next state to which a transition occurs due to the event. Column H provides an event parameter list for the event that includes a list of attribute value pairs in numeric format, such as included in the content of the Events tab shown in Table 300. Columns I, J, and K provide counts, such as an aggregated carrier count, a dual carrier count, and an ERAB count. Column L provides an ID of the primary serving cell (Pcell), provided by cell ID enrichment. Column M provides a descriptive comment with a brief explanation of the event.

ESRs including data from the events history table are output by mediator 114 to big data lakes 120 and long term storage 122, such as to be processed by machine learning and/or artificial intelligence. The ESRs can be provided by mediator 114 to big data lakes 120 in a compatible format, such as Kafka, without limitation to a particular format.

The size of an events history table, including the event parameter list (column H), is the order of a few kilobytes. The information is abstracted to a level suitable for storage in big data systems and for consumption by an artificial intelligence or machine learning system.

The events history table can be sorted by cell to obtain user plane AS traffic summaries and radio channel summaries for individual cells. Furthermore, the NAS UP data, can be correlated to the AS data (provided by cell trace).

Regarding the correlation of the NAS UP data and the AS data, the NAS UP data is provided by S1U taps or probes, includes UP flow records, and provides OSI Layer 3 to 4 information. The AS data includes RAN control plane data provided by the CTR from network equipment manufacturer (NEM) eNBs/gNBs is received by the TCE (e.g., as provided to a base station OAM IP port and provided for analysis via TCP connection). Correlation of the NAS UP data and AS data enables analysis of most UP issues caused by the RAN, such as call gaps, in particular the RAN transition states, which has not previously been available.

By storing the correlated data in table format in a numeric format that can be accessed and used by big data systems managing the big data lakes 120, the correlated data can be consumed as big data and analyzed to monitor quality of service attributes, surrounding conditions, and factors that affect quality of service attributes. The large-scale analysis of quality of service attributes based on the correlated data could not have previously been performed.

The state machine created and stored in the event history table correlates the RRC and RRC events to the UP flow records based on timing as indicated by timestamps. The UP flow records are correlated to intra-segment RF conditions which provides visibility to changes in MOS within an RRC session over its duration, such as during a video call that lasts for minutes or one hour. Since the NAS UP provides indicators of UP QoE and the AS provides parameters of the RAN RF, the data output by mediator 114 (e.g., ESRs) provides a correlation of UP QoE and RAN RF parameters in a consolidated fashion that can be tracked per cell, per cell group, per geographic location, per IMSI, etc. This correlation can be used for multivariable analysis with core network control. Some example, non-limiting of examples of variables for the multivariable analysis include: for the NAS UP data: TCP retransmissions, MOS video or voice score, packet drops, timeout, etc.; for AS data: RSRP, RSRQ, SINR, handover failure rate, 5G to LTE bearer fall back, edge cell location, etc. Furthermore, the data output by mediator 114 can be compatible with machine learning and/or artificial intelligence for implementing multivariable analysis with core network control.

Figure 4:
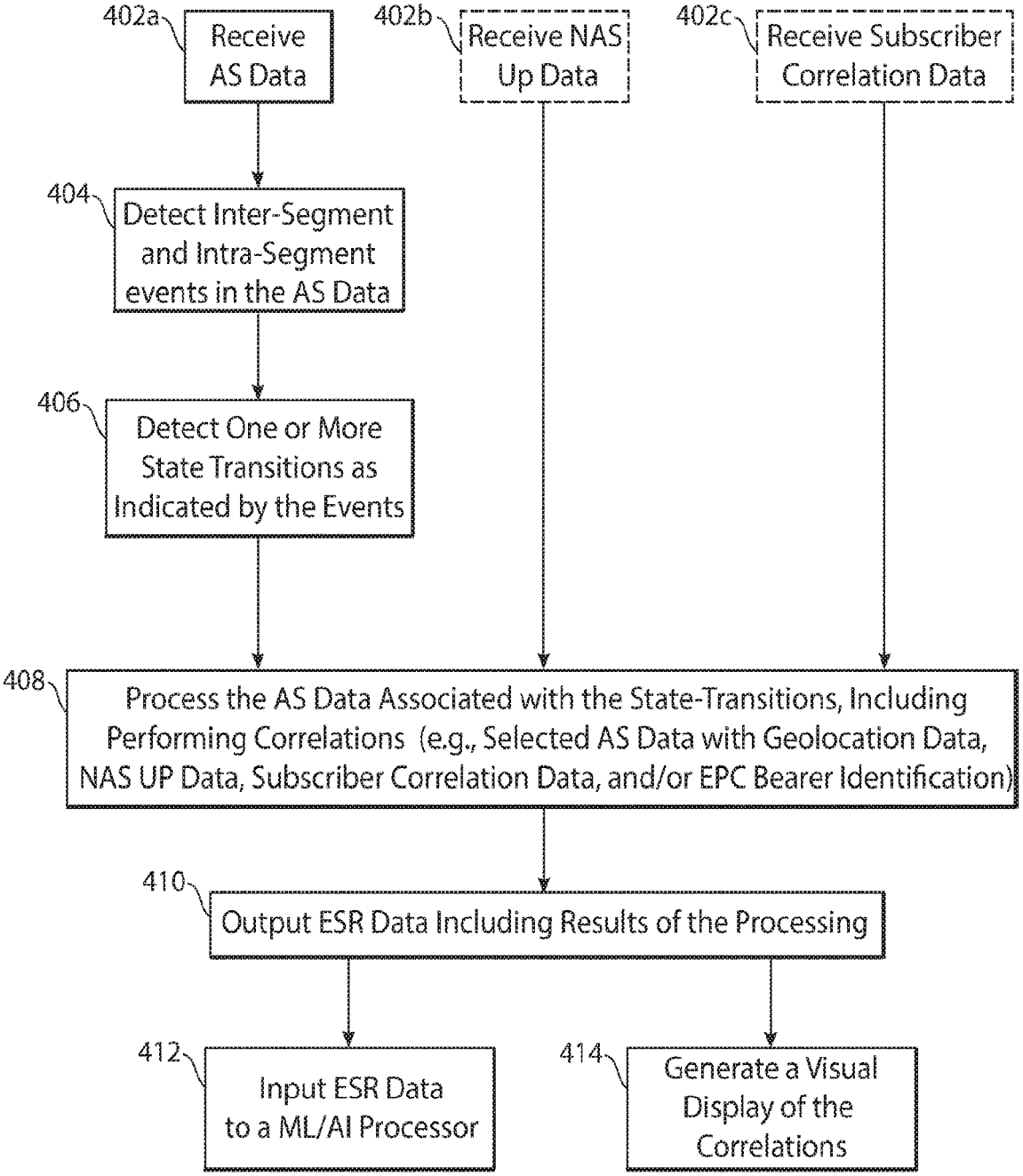
FIG. 4 illustrates a data flow diagram of an example method of processing data for monitoring a radio access network (RAN) in accordance with an illustrative embodiment of the present disclosure.

With reference now to FIG. 4, shown is a data flow diagram demonstrating implementation of the various exemplary embodiments. It is noted that the order of flow of data shown in FIG. 4 is not required, so in principle, the various flow of data may be performed out of the illustrated order or in parallel. Also certain flows may be skipped, different flows may be added or substituted, or selected flows or groups of flows may be performed in a separate application following the embodiments described herein.

With reference to FIG. 4, an example method for monitoring a RAN is shown. The method can be performed by an ESR manager, such as ESR manager 102 shown in FIG. 1. At block 402a, AS data is received. The AS data is a function of CTRs associated with wireless communication transported to or from one or more cells of the RAN. The CTRs are obtained at a granularity sufficient to detect one or more events.

In one or more embodiments, the method further includes receiving, at block 402b, NAS UP data from a core component of a data packet communication network, wherein the NAS UP data correlates to the wireless communication.

At block 404, inter-segment and intra-segment events are detected in the AS data. Examples of intra-segment events are provided in FIG. 2, including measurement reports, ERAB add/release, secondary carrier add/release, dual connectivity add/release. Examples of intra-segment events in FIG. 2 include RRC connections handovers. The inter-segment events define a segment and the intra-segment events occur during a segment. A segment is defined by a beginning, end, or any handovers of a call included in the wireless communication.

At block 406, one more RRC state transitions are detected in the AS data as indicated by the events. Examples of state transitions are shown in FIG. 2 for RRC connections include: idle, connected, and reconnected. The state transitions include inter-segment state transitions associated with inter-segment events and intra-segment-state transitions associated with intra-segment events.

At block 408, the AS data associated with the respective one or more state transitions is processed. The processing can include selecting particular data and making correlations (e.g., selected AS data correlated with geolocation data, NAS data, UP data, subscriber correlation data, and/or Evolved Packet Core (EPC) bearer identification). The correlations can be performed by creating an event history table, such as shown in Table 300, The event history table includes entries for respective column and row intersections, such as by using IMSI or IMEI and/or timestamp (e.g., for a range of time) as an index. Mediator 114 enters data in the appropriate entries with corresponding fields included in the AS data and UP data. The method continues at block 410 once the event history table is completed or a timeout condition occurs. By entering the data into the event history table, information about the respective inter-segment and intra-segment events, including any of the events shown in FIG. 2, are correlated via the IMSI or IMEI and timestamp indexing and are further correlated with any UP flow records that are created over a same time period indicated by the timestamps.

At block 410, an ESR is output, wherein the ESR includes results of the processing performed at block 408. The ESR includes results of the correlation between the non-AS user plane data and the AS data as indexed by IMSI or IMEI and timestamps. The ESRs include QoS attributes and surrounding conditions that can be analyzed, e.g., by big data lakes, for determining patterns and trends in the correlations between the QoS attributes and surrounding conditions.

In one or more embodiments, the AS data includes geolocation data. Processing the data from the AS data includes correlating (e.g., at block 408) a geolocation from the AS data to each state transition. The ESR includes the geolocation data correlated to the one or more detected state transitions.

The ESR includes data from at least two of the following: control or user plane messages between a user equipment of one or more user equipment and any of the base stations of the cells of the RAN; control plane messages between any of the base stations and one or more core components of the data packet communication network; control plane messages between any two of the base stations; control plane messages between one of the user equipment and the one or more core components; identification information identifying one or more of the user equipment; and identification information identifying one or more subscribers using the one or more user equipment.

In one or more embodiments, the ESR includes information about radio frequency conditions internal to a cell of the one or more cells and associated with the one or more detected state transitions.

In one or more embodiments, the AS data includes user plane data from vendor provided CTRs and indicators of identification of the one or more cells. The method further includes correlating (e.g., at block 408) user plane data from the CTRs about high level user plane data including bandwidth and throughput user plane conditions over time internal to an identified cell of the one or more cells. The ESR includes bandwidth and throughput user plane conditions over time correlated to the identified cell.

In accordance with one or more embodiments, the one or more detected state transitions that occurred during a segment include:

(a) receipt of measurement reports received from the user equipment, and the ESR stores selected information from the received measurement reports;

(b) receipt of signaling information on the addition of one or more secondary carriers between the user equipment and one or more secondary cells, and the ESR stores selected information related to the added one or more secondary carriers;

(c) receipt of signaling information on the release of one or more secondary carriers between the user equipment and one or more secondary cells, and the ESR stores selected information related to the released one or more carriers.

In accordance with one or more embodiments, the method further includes receiving, at optional block 402c, identification of an EPC bearer transporting packets associated with the wireless communication, wherein the ESR includes identification of the EPC bearer that transported the packets associated with the wireless communication.

Figure 5:
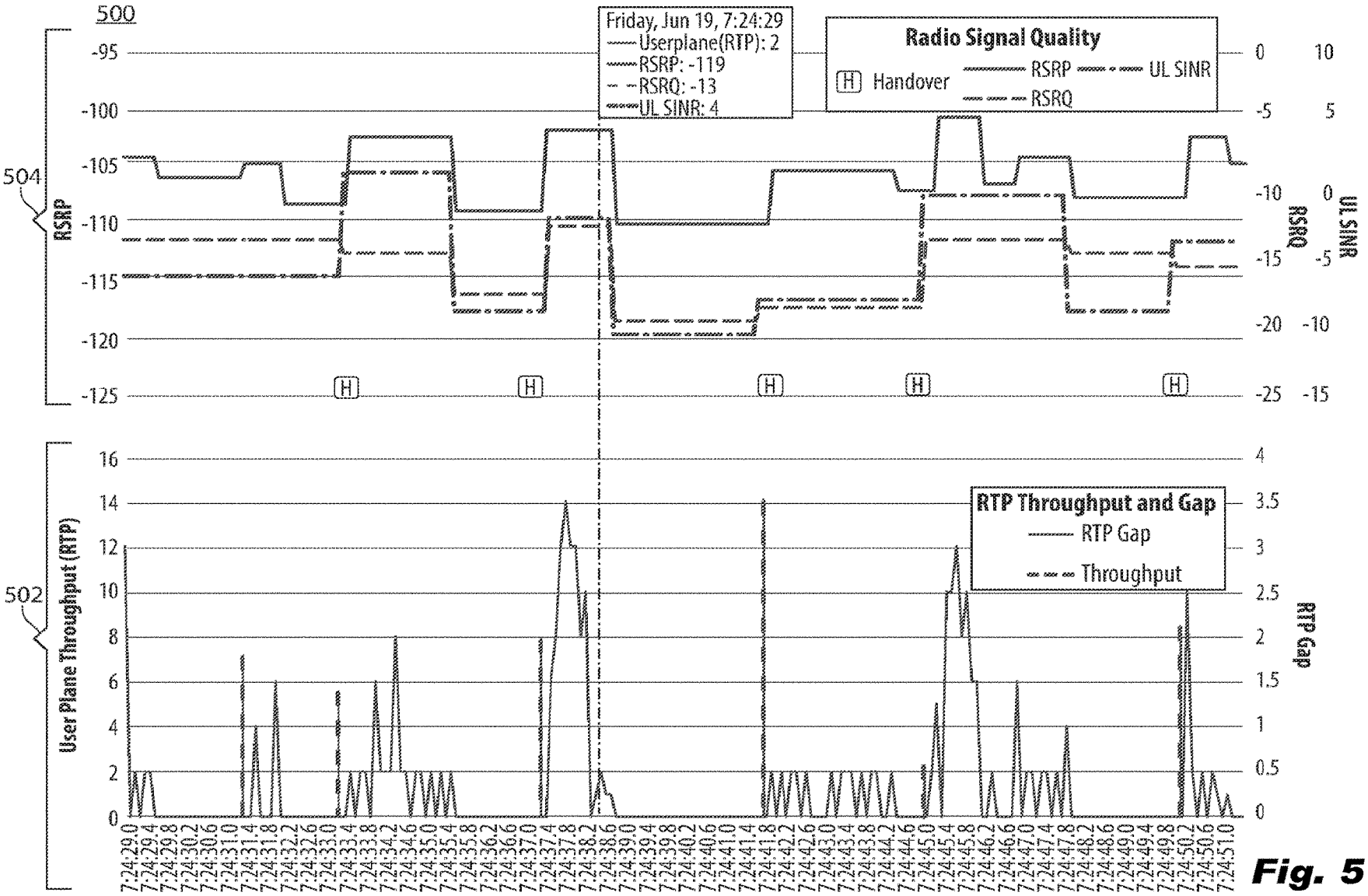
FIG. 5 illustrates a screen shot of data collected during a voice over long-term evolution (LTE) session that has been correlated by a mediator of the communication network system shown in FIG. 1.

With reference to FIG. 5, in one or more embodiments, the correlation information includes a visual display of relationships between the AS data and the non-AS user plane signaling. A screen shot 500 shows data collected during a voice over LTE session that has been correlated based on timestamps associated with the data. UP throughput is represented at a top portion 502 of screenshot 500 and RF conditions and RAN events are represented at a bottom portion 504 of screenshot 500.

In one or more embodiments, the method further includes, at block 402c, receiving subscriber correlation data that correlates a non-IMSI subscriber temporary ID to an international mobile subscriber identity (IMSI), wherein the non-IMSI subscriber temporary ID is included in the AS data or the ESRs. The subscriber correlation data can be provided, for example, by the IMSI table sources 106 shown in FIG. 1. The method further includes correlating (e.g., at block 408) the non-IMSI subscriber temporary ID to its IMSI and including results of the correlation in the ESRs.

In one or more embodiments, the method further includes, at block 412, inputting the ESRs to a machine-learning algorithm.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the TCEs 104, ESR 102, and ML/AI processor 130 may be implemented or executed by one or more computer systems. For example, packet analysis system can be implemented using a computer system such as example computer system 600 illustrated in FIG. 6. In various embodiments, computer system 602 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects having data and/or functions that can be invoked by data values, classes (wherein the objects (as an instance of a class) and classes form a virtual machine), virtual components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Figure 6:
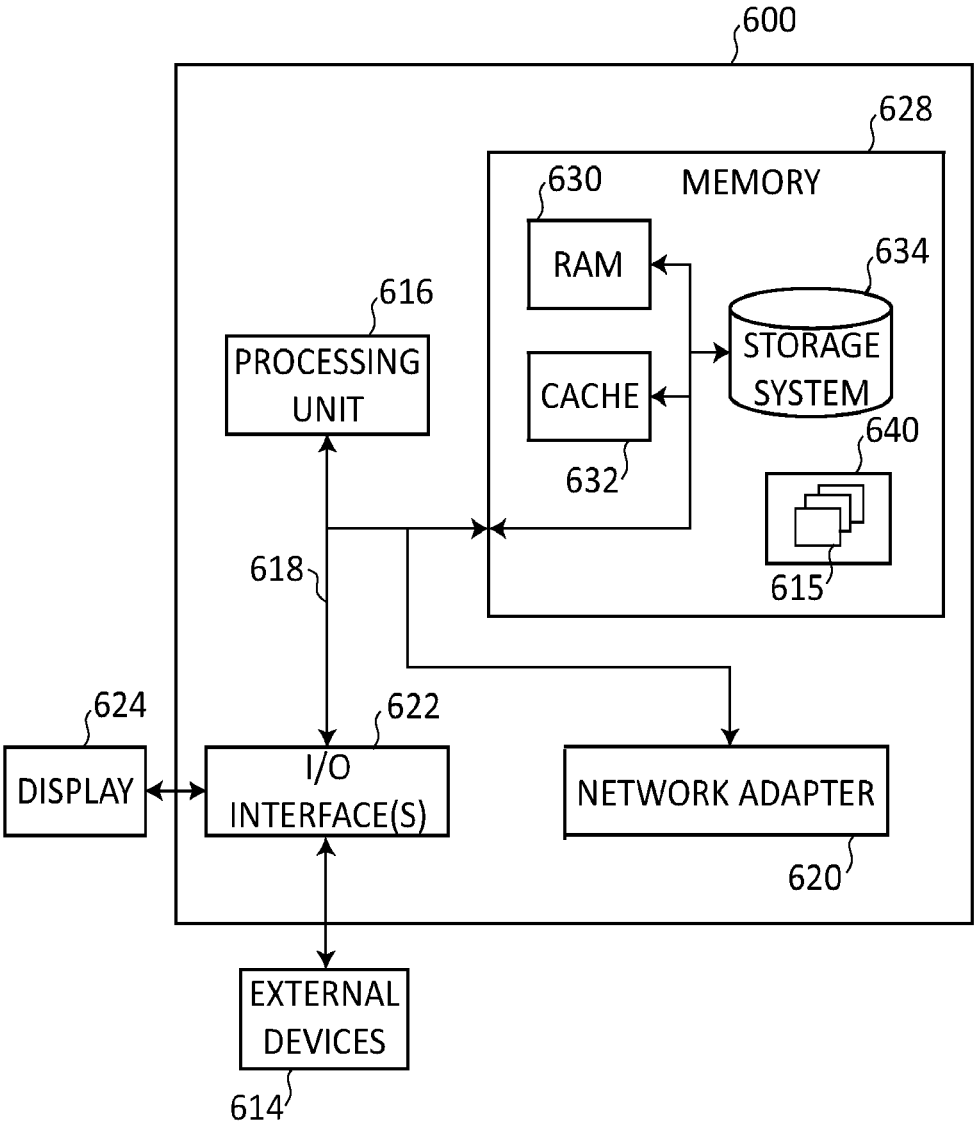
FIG. 6 illustrates a schematic block diagram of an example network computing device that implements an ESR manager, trace collection entity, and optionally a machine learning and/or artificial intelligence processor intercept device shown in FIG. 1, in accordance with an illustrative embodiment of the present disclosure.

Computer system 602 is shown in FIG. 6 in the form of a general-purpose computing device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and PCI bus or a virtual messaging link like MQ (Message Queuing)

Computer system 602 typically includes a variety of computer system readable media. Such media may be any available media that is accessible by the TCEs 104, ESR 102, and ML/AI processor 130, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure. In embodiments, buffer 214 shown in FIG. 2 may be included in memory 628.

Program/utility 640, having a set (at least one) of program modules 615, such as the AS session record manager 110, the NAS UP session record manager 112, and the mediator 114, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keyboard, a pointing device, a display 624, etc.; one or more devices that enable a user to interact with computer system 602; and/or any devices (e.g., network card, modem, etc.) that enable the TCEs 104, ESR 102, and ML/AI processor 130 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. For example, TCEs 104, ESR 102, and ML/AI processor 130 may use network adapter 620 to communicate with each other via a network, such as a network that includes data paths 110. As depicted, network adapter 620 communicates with the other components of the TCEs 104, ESR 102, and ML/AI processor 130 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the ESR manager 102 include receiving AS data at granularity sufficient to detect intra-segment events. By recognizing intra-segment events, useful data is available and tracked. Furthermore, this data can be correlated with NAS UP data and data from IMSI table sources and output as ESRs. The ESRs include data that corresponds to inter-segment (in-between segments) and intra-segment (within a segment) state transitions. By further processing only the data that is associated with the inter-segment and intra-segment state transitions, resources are available to perform meaningful processing, including correlations and selections. The resulting ESRs are therefore meaningful and useful for tracking performance of selectable RAN components or core components and making adjustments, e.g., by controlling, the selectable RAN or core components.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method of [monitoring a] *improving* radio access network (RAN) *performance*, the *computer-implemented* method comprising:

receiving access stratum (*AS*) data that is a function of cell trace records (CTRs) associated with wireless communication transported to or from one or more cells of [the RAN] *a radio access network* (*RAN*), wherein the CTRs are obtained at a granularity sufficient to detect one or more *radio resource control* (*RRC*) events[, the events including one or more events that define a segment and one or more events that occur during a segment, wherein a segment is defined by the beginning, end, or any handovers of a call included in the wireless communication];

detecting in the [access stratum] (*AS*) data one or more state transitions as indicated by the *one or more RRC* events*, wherein the one or more state transitions comprise a state transition of a call from a first state to a second state comprising an RRC idle state, an RRC connected state, an RRC connection re-establishment state, or a handover state*; [and]

outputting an enhanced session record (ESR) including information processed from the [access stratum] *AS* data associated with the respective one or more detected state transitions*;*

*inputting the ESR into a machine learning model to identify one or more call gaps associated with the one or more detected state transitions; and*

*adjusting, based on the one or more identified call gaps, one or more parameters of the one or more cells of the RAN to improve performance of the RAN.*

2. The *computer-implemented* method of claim 1, wherein the [access stratum] *AS* data includes geolocation data, the *computer-implemented* method further comprising correlating [a] *the* geolocation *data* from the [access stratum] *AS* data to the respective *one or more detected* state transitions, and the ESR further includes the geolocation data correlated to the *respective* one or more detected state transitions.

3. The *computer-implemented* method of claim 1, wherein the ESR includes data from at least two of*:* control or user plane messages between a user equipment of one or more user equipment and any [of the] base stations of the *one or more* cells of the RAN, wherein each of the one or more user equipment is using the RAN for communication with another of the one or more user equipment; control messages between any of the base stations and one or more core components of an evolved packet core station of a data packet communication network; communication between any two of the base stations; control messages between a user equipment and the one or more core components; identification information identifying one or more of the user equipment; and identification information identifying one or more subscribers using the one or more user equipment.

4. The *computer-implemented* method of claim 1, wherein the [access stratum] *AS* data includes information about radio frequency conditions internal to a cell of the one or more cells and associated with the one or more detected state transitions, wherein detecting in the [access stratum] *AS* data the one or more state transitions further includes detecting *the* information about the radio frequency conditions internal to the cell correlated to the one or more detected state transitions, and wherein the ESR further includes the information about the radio frequency conditions internal to the cell correlated to the one or more detected state transitions.

5. The *computer-implemented* method of claim 1, wherein the [access stratum] *AS* data includes high level radio bearer level user plane data including bandwidth and throughput from the CTRs and indicators of identification of the one or more cells, wherein the *computer-implemented* method further includes*:* detecting *conditions, over time of* the *high level radio bearer level* user plane data [about the bandwidth and throughput user plane conditions over time], internal to an identified cell of the one or more cells and correlated to the one or more detected state transitions, and wherein the ESR further includes *the conditions over time of* the detected *high level radio bearer level* user plane data [about the bandwidth and throughput user plane conditions over time], internal to an identified cell of the one or more cells and correlated to the one or more detected state transitions.

6. The *computer-implemented* method of claim 1, wherein the one or more detected state transitions include at least one of:

receipt of measurement reports received from [the] user equipment, and the [enhanced] ESR further includes selected information from the received measurement reports;

receipt of signaling information on [the] *an* addition of one or more secondary carriers between the user equipment and one or more secondary cells, and the ESR further includes selected information related to the added one or more secondary carriers; and receipt of signaling information on [the] *a* release of one or more secondary carriers between the user equipment and one or more secondary cells, and the ESR further includes selected information related to the released one or more secondary carriers.

7. The *computer-implemented* method of claim 1, further comprising:

receiving non-access stratum (NAS) user plane data derived from NAS user plane signaling from a core component of a data packet communication network, wherein the NAS user plane data correlates to the wireless communication; and correlating the NAS user plane data with the AS data, wherein the ESR further includes results of the correlation between the NAS user plane data and the AS data.

8. The *computer-implemented* method of claim 7, wherein the NAS user plane data includes quality of service information and correlating the NAS user plane data with the AS data includes correlating the quality of service information with the one or more state transitions detected in the AS data.

9. The *computer-implemented* method of claim 7, further comprising generating a visual display of the correlations between the NAS user plane data and the AS data.

10. The *computer-implemented* method of claim 1, further comprising:

receiving subscriber correlation data that correlates a non-international mobile subscriber identity ([IMSI] *non-IMSI*) subscriber temporary ID included in the ESR to an IMSI; and correlating the non-IMSI subscriber temporary ID to [its] *the* IMSI, wherein the ESR further includes representation *of* the correlation of the non-IMSI subscriber temporary ID to [its] *the* IMSI.

11. The *computer-implemented* method of claim [1] *10*, further comprising*:* inputting results of the correlation to a machine learning algorithm.

12. A computer-implemented method of [monitoring a] *improving* radio access network (RAN) *performance*, the *computer-implemented* method comprising:

receiving access stratum (*AS*) data that is a function of cell trace records (CTRs) associated with wireless communication transported to or from one or more cells of [the RAN] *a radio access network* (*RAN*), wherein the [access stratum] *AS* data identifies user equipment and associates timestamps with radio resource control (RRC) events represented in the [access stratum] *AS* data;

receiving non-access stratum [(NAS] (*NAS*) user plane data derived from NAS user plane signaling from a core component of a data packet communication network in association with the wireless communication, wherein the NAS user plane data includes timestamps and identification of user equipment;

correlating, using the timestamps and identification of [end user devices] *user equipment*, the NAS user plane data and the AS data; [and]

outputting an enhanced session record (ESR) including results of the correlation between the NAS user plane data and the AS data*;*

*inputting the ESR into a machine learning model to identify one or more call gaps; and*

*adjusting, based on the one or more identified call gaps, one or more parameters of the one or more cells of the RAN or the core components to improve performance of the RAN.*

13. The *computer-implemented* method of claim 12, wherein the [access stratum] *AS* data includes geolocation data and the correlating includes correlating *the* geolocation data from the [access stratum] *AS* data to the NAS user plane data.

14. The *computer-implemented* method of claim 12, wherein the [access stratum] *AS* data includes information about radio frequency conditions internal to a cell of the one or more cells and correlating the NAS user plane data and the AS data includes correlating the radio frequency conditions from the [access stratum] *AS* data to the NAS user plane data.

15. The *computer-implemented* method of claim 12, wherein the [access stratum] *AS* data includes high level user plane data including bandwidth and throughput from the CTRs and indicators of identification of the one or more cells, [and] *wherein the computer-implemented method further comprises:*

*detecting conditions, over time, of the high level user plane data; and* correlating the NAS user plane data with the AS data, *wherein correlating the NAS user plane data and the AS data* includes correlating the bandwidth and *the* throughput *included by the high level* user plane [conditions over time] for an identified cell to the NAS user plane data.

16. The *computer-implemented* method of claim 15, wherein the NAS user plane data includes quality of service information and correlating the NAS user plane data with the AS data includes correlating the quality of service information with one or more state transitions detected in the AS data.

17. The *computer-implemented* method of claim [12] *16*, further comprising*:* inputting results of the correlation [information] to a machine learning algorithm.

18. A communication network monitoring system [for monitoring a radio access network (RAN) is provided, the communication network monitoring system] comprising:

a *non-transitory computer-readable* memory configured to store instructions;

a processor in communication with the *non-transitory computer-readable* memory, wherein the processor, upon execution of the instructions, is caused to:

receive access stratum (*AS*) data that is a function of cell trace records (CTRs) associated with wireless communication transported to or from one or more cells of [the RAN] *a radio access network* (*RAN*), wherein the CTRs are obtained at a granularity sufficient to detect one or more *radio resource control* (*RRC*) events[, the events including one or more events that define a segment and one or more events that occur during a segment, wherein a segment is defined by the beginning, end, or any handovers of a call included in the wireless communication];

detect in the [access stratum] *AS* data one or more state transitions as indicated by the *one or more RRC* events*, wherein the one or more state transitions comprise a state transition of a call from a first state to a second state comprising an RRC idle state, an RRC connected state, an RRC connection re-establishment state, or a handover state*; [and]

output an enhanced session record (ESR) including information processed from the [access stratum] *AS* data associated with the respective one or more detected state transitions*;*

*input the ESR into a machine learning model to identify one or more call gaps associated with the one or more detected state transitions; and*

*adjust, based on the one or more identified call gaps, one or more parameters of the one or more cells of the RAN to improve performance of the RAN.*

19. The communication network monitoring system of claim 18, wherein the processor, upon execution of the instructions, is further caused to:

receive non-access stratum (NAS) user plane data derived from NAS user plane signaling from a core component of a data packet communication network, wherein the NAS user plane data correlates to the wireless communication; and correlate the NAS user plane data and the AS data, wherein the ESR includes results of the correlation between the NAS user plane data and the AS data.

20. A communication network monitoring system [for monitoring a radio access network (RAN) is provided, the communication network monitoring system] comprising:

a *non-transitory computer-readable* memory configured to store instructions;

a processor in communication with the *non-transitory computer-readable* memory, wherein the processor, upon execution of the instructions, is caused to:

receive access stratum (*AS*) data that is a function of cell trace records (CTRs) associated with wireless communication transported to or from one or more cells of [the RAN] *a radio access network* (*RAN*), wherein the [access stratum] *AS* data identifies user equipment and associates timestamps with radio resource control (RRC) events represented in the [access stratum] *AS* data;

receive non-access stratum (NAS) user plane data derived from NAS user plane signaling from a core component of a data packet communication network in association with the wireless communication, wherein the NAS user plane data includes timestamps and identification of user equipment;

correlate, using the timestamps and identification of end user devices, the NAS user plane data with the AS data, [and]

output an enhanced session record (ESR) including information processed from the [access stratum] *AS* data associated with the [respective] one or more detected state transitions, wherein the ESR includes results of the correlation between the NAS user plane data and the AS data*;*

*input the ESR into a machine learning model to identify one or more call gaps associated with the one or more detected state transitions; and*

*adjust, based on the one or more identified call gaps, one or more parameters of the one or more cells of the RAN or core components to improve performance of the RAN.*

21. The communication network monitoring system of claim 20, wherein the NAS user plane data includes quality of service information and correlating the NAS user plane data with the AS data includes correlating the quality of service information with one or more state transitions detected in the AS data.

* * * * *